United States Patent [19]

Harvey

[11] Patent Number: 4,598,420
[45] Date of Patent: Jul. 1, 1986

[54] OPTICAL GRID ANALYZER SYSTEM FOR AUTOMATICALLY DETERMINING STRAIN IN DEFORMED SHEET METAL

[75] Inventor: Dennis N. Harvey, Chaska, Minn.

[73] Assignee: MTS Systems Corporation, Minneapolis, Minn.

[21] Appl. No.: 559,406

[22] Filed: Dec. 8, 1983

[51] Int. Cl.$^4$ .............................................. G06K 9/00
[52] U.S. Cl. ........................................ 382/8; 358/101; 358/107; 364/508; 382/22
[58] Field of Search ............... 382/8, 22, 25; 358/101, 358/106, 107; 364/508; 73/760, 783; 356/32, 35

[56] References Cited

U.S. PATENT DOCUMENTS

| | | | |
|---|---|---|---|
| 3,370,492 | 2/1968 | Treff | 178/6 |
| 3,976,827 | 8/1976 | Alien et al. | 178/6 |
| 4,041,286 | 8/1977 | Sanford | 358/107 |
| 4,163,212 | 7/1979 | Buerger et al. | 382/8 |
| 4,223,387 | 9/1980 | Danielsson et al. | 382/8 |
| 4,288,852 | 9/1981 | Holland | 364/508 |
| 4,302,773 | 11/1981 | Yoshida | 358/106 |
| 4,454,542 | 6/1984 | Miyazawa | 358/106 |
| 4,521,807 | 6/1985 | Werson | 382/8 |
| 4,555,798 | 11/1985 | Broadbent, Jr. et al. | 382/8 |

OTHER PUBLICATIONS

Robert A. Ayres, "Aids for Evaluating Sheet Metal Formability: The Limiting Dome Height (LDH) Test and the Grid Circle Analyzer", pp. 47–64.
S. S. Hecker and A. K. Ghosh, "The Forming of Sheet Metal", *Scientific American*, Nov. 1976, vol. 235, No. 5, pp. 100–108.
Robert A. Ayres, et al., "Grid Circle Analyzer-Computer Aided Measurement of Deformation", Society of Automotive Engineers Transactions, 88 (3) (1979) pp. 2630–2634, Paper No. 790741.

*Primary Examiner*—Leo H. Boudreau
*Assistant Examiner*—Joseph Mancuse
*Attorney, Agent, or Firm*—Kinney & Lange

[57] ABSTRACT

An optical grid analyzer automatically determines strain in sheet metal during or following a forming operation by measuring the change in radius of open circles which are stretched into ellipse patterns as a result of the forming operation. The system includes a hand-held video camera unit which produces an analog video image of one of the ellipse patterns. An interface device converts the analog image to a binary image, and then converts the binary image to a transition point image which represents the coordinates of those pixels located at an edge of the pattern. A digital computer sorts the transition point data into inner and outer edges of the pattern. The digital computer then derives major and minor radii for the outer edge and for the inner edge, and averages the inner and outer edge radii to produce average major and minor radii representing the center of the pattern. The computer then calculates strain values based upon the average major and minor radii and the radius of the undeformed circle.

22 Claims, 5 Drawing Figures

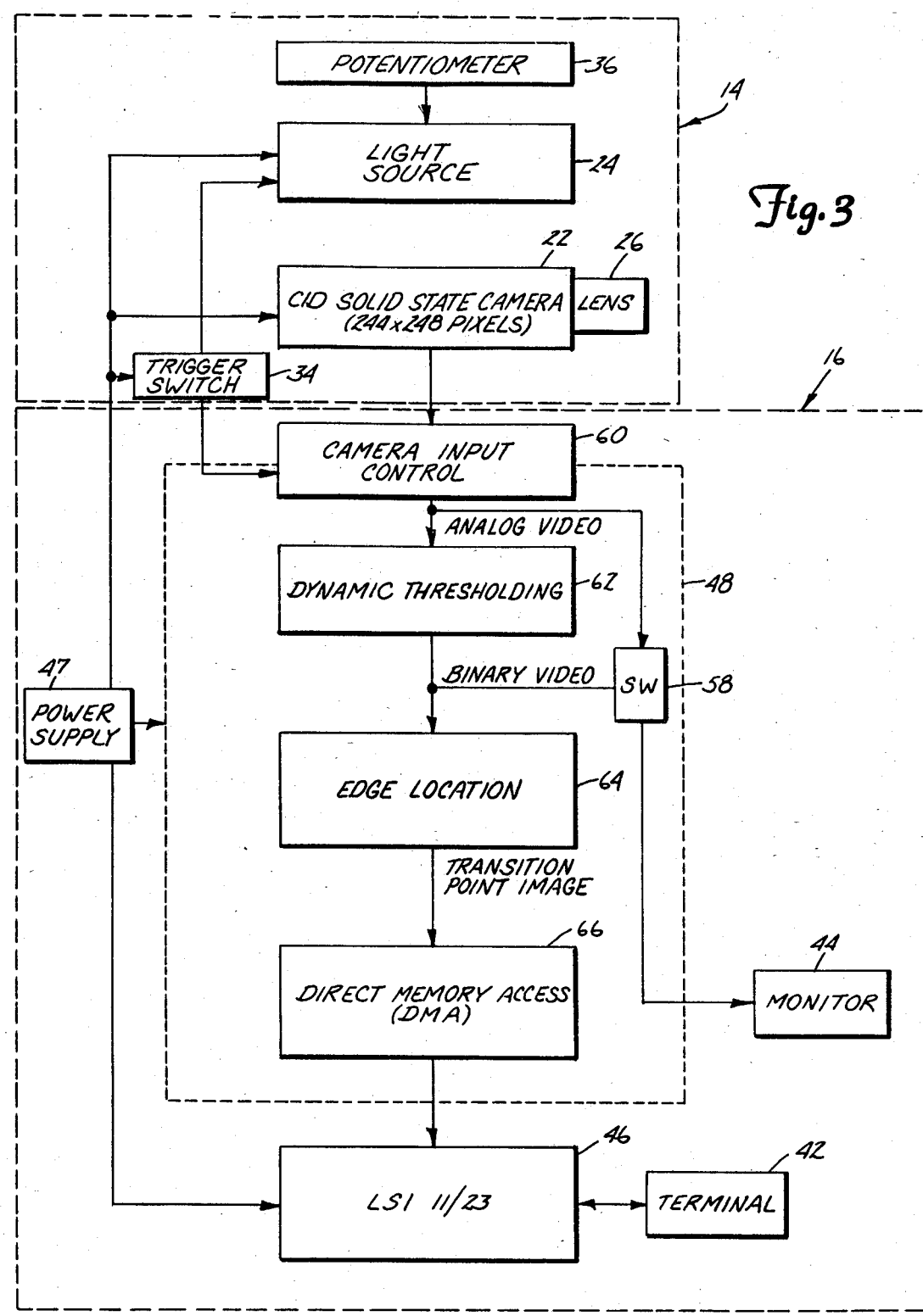

OPTICAL GRID ANALYZER SYSTEM FOR AUTOMATICALLY DETERMINING STRAIN IN DEFORMED SHEET METAL

BACKGROUND OF THE INVENTION

1. Field of the Invention

The present invention relates to systems for optical measurement of strain during mechanical testing. In particular, the present invention relates to an improved optical grid analyzer for determining strain in sheet metal during or following a forming operation.

2. Description of the Prior Art

Discussions of optical measurement of strain or displacement during mechanical testing have appeared in the literature for over twenty years. Although these optical measurement techniques which have been described have often been complex and expensive, the inherent advantages of optical measurement have made these techniques justifiable in many cases.

A principal benefit of optical strain measurement is that it can be noncontacting. There are no stress raisers caused by contact points or knives. Frail specimens are not affected by the spring rate, dampening, or resonance of an attached extensometer. Furthermore, optical instrumentation can be external to the environment of the test (e.g. high temperatures, salt sprays, vacuum). This is advantageous to both the test specimen and the extensometry.

Optical strain measurement can be easier to use and more productive than conventional extensometry. It contributes to a higher test throughput because it does not require attachment to each test specimen before testing begins and removal from the test specimen after testing is completed. It also is not physically subjected to the potential of violent failure of the test specimen which can occur at the conclusion of a test.

A significant advantage of some optical strain measurement techniques is that principal strains can be measured regardless of their orientation to the extensometry. This is often very important when measurements are taken in regions with strain gradients or when the orientation of the principal strain is unknown or changing.

Circle grid analysis is an optical measurement technique for measuring the principal strains in sheet metal. A pattern of circles is photogridded or electrochemically etched onto the sheet metal prior to deformation. If the strain gradient is small with respect to the size of the circles, the circles will generally become elliptical during deformation of the sheet metal. The ratios of the major and minor diameters (or radii) of the deformed circle to the original circle diameter (or radius) are used to calculate the principal strains. The measurements are typically made with an optical comparator or a machinist's microscope.

The greatest use of circle grid analysis is in the generation of forming limit diagrams, which are plots of the limiting major principal strain as a function of the minor principal strain. Forming limit diagrams can be used for material evaluation, lubrication evaluation, and during die tryout.

The growth of the use of circle grid analysis has been hampered by several factors. First, measuring the deformed circles is a very tedious and time-consuming task. This results in delays in obtaining data, and in unhappy, under-utilized technicians. Second, the subjective nature of most of the circle measurement techniques results in inaccuracy in the data obtained by those techniques.

In 1979, Robert Ayres et al addressed these limitations in a paper describing a machine vision system for circle grid analysis. Robert A. Ayres, Earl G. Brewer, and Steven W. Holland, "Grid Circle Analyzer—Computer Aided Measurement of Deformation", *Society of Automotive Engineers Transactions*, 88(3) (1979) pp. 2630–2334, Paper No. 790741. The grid circle analyzer (GCA) system described by Ayres et al used photogridded solid circles on the sheet metal specimen, and all of the data processing was done in software by a digital computer.

Ayres et al concluded that the GCA system measured strain in sheet metal with accuracy that was comparable to optical techniques, in about one-third the time, and with greater objectivity than manual methods. They further concluded that the accuracy of the GCA system was dependent on both the sharpness of the edge and the contrast of the deformed circle to the background, that the GCA system could read strains in a large stamping without sectioning; and that the GCA system could be used by a relatively untrained operator.

The grid circle analyzer (GCA) system described by Ayres et al was further described in U.S. Pat. No. 4,288,852 by Steven W. Holland. The system converted the analog signals from the video camera to digital gray scale pixel data which was stored in the digital computer. The GCA system then required the computer to perform a time-consuming edge detection routine. This routine found the edge of the deformed solid circle by measuring the light intensity gradient at many locations in the digitized image. The gradient data was used to determine a threshold level for conversion of the digital gray scale image to a binary video image. The points residing on the edge of the deformed circle were then determined from this binary video image. An ellipse was fitted to the edge points, the major and minor diameters of the fitted ellipse were determined, and the strain induced in the sample was calculated by the computer as a function of the calculated diameters and the diameter of the circles before deformation.

While the GCA system described in the Ayres et al article and in the Holland U.S. Pat. No. 4,288,852 provided advantages over manual measurement systems for circle grid analysis, there has been a continuing need for improved systems which are easier and more convenient to use by an operator, which require less time to complete a strain analysis, and which require less computer storage and computation power.

SUMMARY OF THE INVENTION

The present invention is an improved optical grid analyzer system for automatically determining strain induced in a sheet metal specimen during a forming operation. In the present invention, the sheet metal specimen has a grid of open circles of predetermined radius thereon. The open circles are stretched into a generally ellipitcal open patterns as a result of the forming operation.

In the present invention, analog signals representative of light intensity of pixels of an image of a portion of the sample including one of the patterns are converted to binary values to produce a binary image. This binary image is then converted to a transition point image which represents the coordinates of pixels on an image edge. The transition point image is then used to derive an outer edge and an inner edge of the pattern. First ellipse parameters (e.g. major and minor radii or diameters of the pattern) are derived from the inner edge, and second ellipse parameters (e.g. major and minor radii or diameters) are derived from the inner edge. The first and second ellipse parameters are used to calculate average ellipse parameters of the pattern. The strain values are then calculated based upon the average ellipse parameters and a circle size parameter (radius or diameter) of the undeformed circle.

The present invention eliminates the time-consuming edge detection computer routine used in the prior art GCA system without sacrificing accuracy in the measurement of major and minor radii or diameters or the calculation of strain. The time-consuming edge detection routine performed by the GCA system used gradient-weighted intensity data to determine a threshold level because the perceived size of the pattern was dependent on absolute light level. With a fixed threshold level, a solid circle would appear smaller in a bright image (high illumination) than in a dark image (low illumination).

This problem is eliminated in the present invention by use of an open circle instead of a solid circle pattern. While the thickness of the line forming the open circle will appear to vary with the level of illumination of the image, the center of that line is independent of illumination level. With the present invention, therefore, an outer edge and an inner edge of the deformed pattern are located, major and minor radii or diameters are independently derived for these inner and outer edges, and then those radii (or diameters) are used to determine average major and minor radii (or diameters) (which represent the center of the line which forms the deformed circle pattern).

With the present invention, therefore, the conversion from an analog to a binary image is performed simply and quickly without the need for complicated and time-consuming computer calculations, and without the need for computer storage of a digital gray scale value for each pixel. Since the conversion simply involves comparison of an analog signal to a threshold value, the present invention permits the use of simple dedicated hardware to produce the binary image.

BRIEF DESCRIPTION OF THE DRAWINGS

FIG. 3 is an electrical block diagram of the optical grid analyzer system of FIG. 1.

DETAILED DESCRIPTION OF THE PREFERRED EMBODIMENTS

Figure 1:
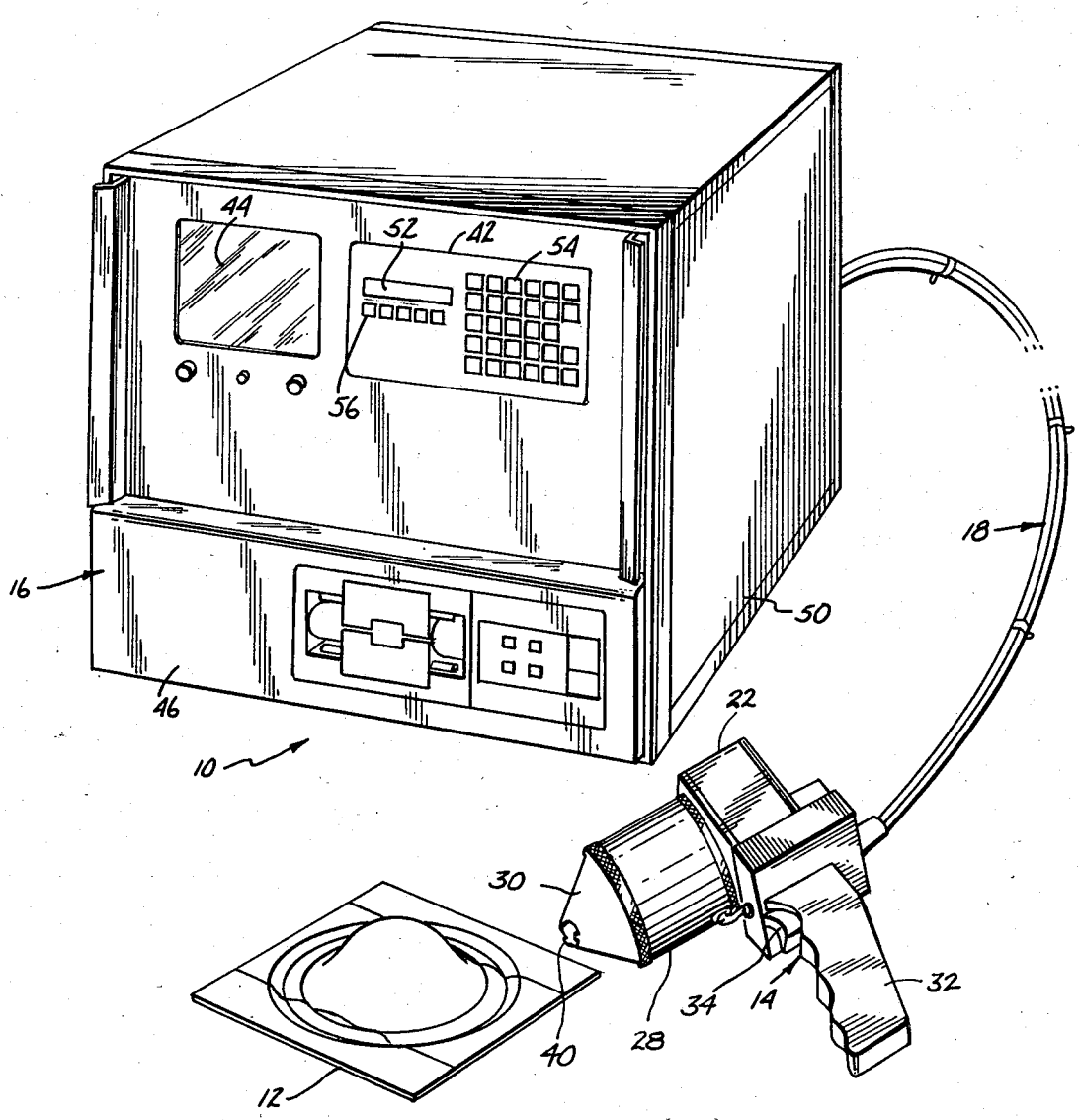
FIG. 1 is a perspective view of a preferred embodiment of the optical grid analyzer system of the present invention.

In FIG. 1, optical grid analyzer system 10 is shown, together with sheet metal specimen 12 which is to be analyzed by system 10. Optical grid analyzer system 10 includes hand-held camera unit 14 and console 16, which are connected to one another by cables 18.

Figure 2:
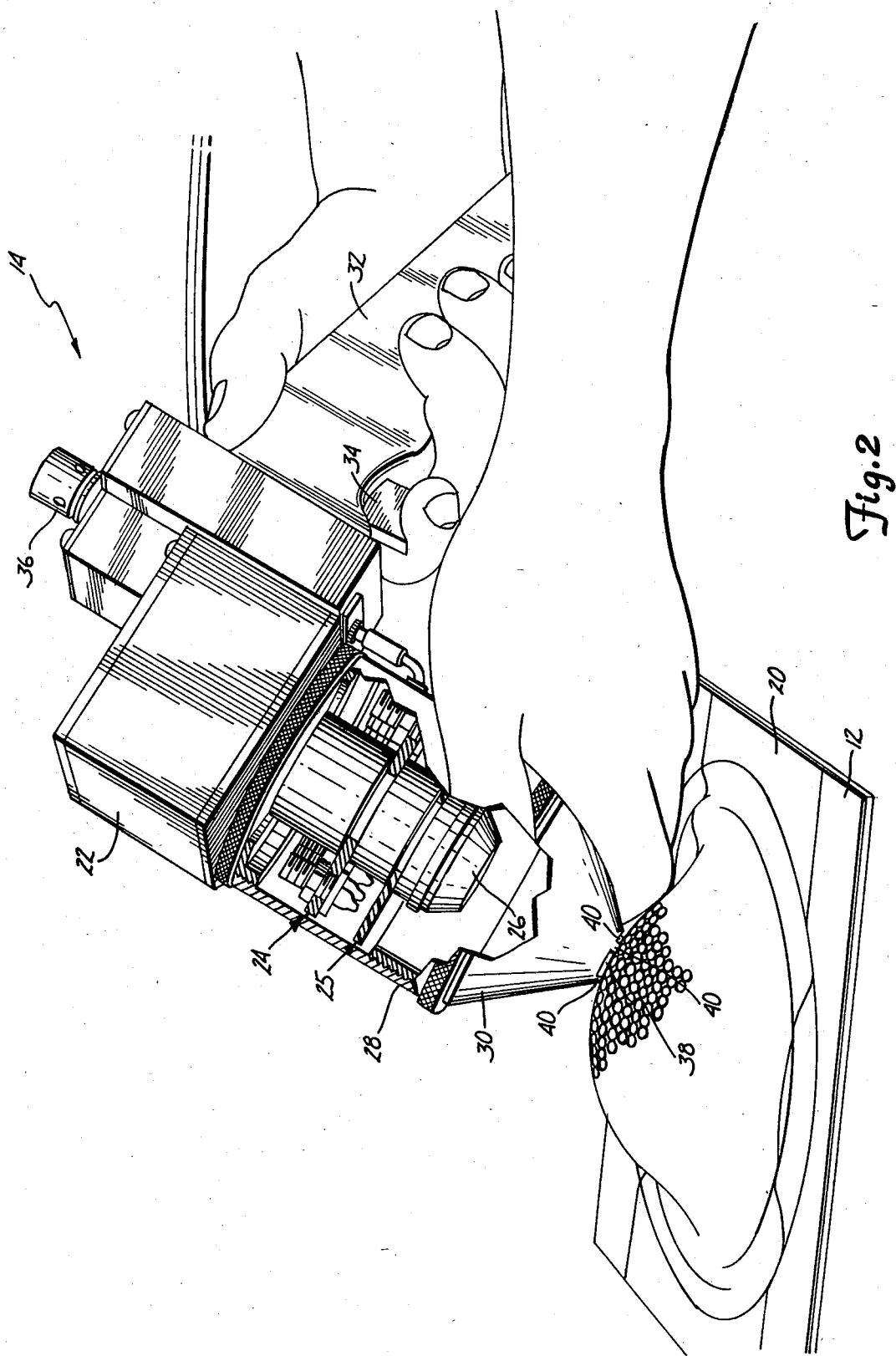
FIG. 2 is a perspective view (with portions broken away) showing the hand-held camera unit of the optical grid analyzer system of FIG. 1.

As better shown in FIG. 2, sheet metal specimen 12 contains a grid 20 of open circles which are applied to or formed on the surface of sheet metal 12 before deformation. During deformation, the circles become elliptical. Optical grid analyzer system 10 measures the major and minor radii (or diameters) of selected deformed circles. Based upon those major and minor radii (or diameters) and the original circle radius (or diameter), optical grid analyzer system 10 automatically computes engineering and true strain values.

Grid 20 of open circles is formed by photogridding or by electrochemical etching. The photogridding technique yields a precise image, but is time-consuming and the photogridded pattern can lose its adhesion at high strains. The electrochemical etch technique, on the other hand, is less difficult and is more tenacious at high strains, but yields a lower contrast image. It has been determined, however, that with system 10 the contrast of grid 20 is secondary in importance to a difference in sheen. Both the sheen of the pattern and of the bare metal is very high for photogridded patterns. In an electrically etched pattern, the sheen is very low. Using electrochemical etching is, therefore, not only desirable for its simplicity, but is also desirable because its greater difference in pattern sheen yields a superior image to be analyzed by optical grid analyzer system 10.

Hand-held camera unit 14 includes solid state camera 22, light source 24, light diffuser ring 25, lens 26, lens cover tube 28, nose cone 30, pistol hand grip 32, two-position trigger switch 34, and potentiometer 36. Both camera 22 and light source 24 are powered by electrical power supplied through cable 18 from console 16. Camera 22 provides frames of gray scale analog video which represent an array of pixels.

In a preferred embodiment of the present invention, camera 22 is a General Electric TN 2500 CID (current injected device) solid state camera that provides a high resolution video image array of 244×248 pixels. This video image array is based upon an image of the portion of grid 20 over which nose cone 30 is positioned. Lens 26 (which is located within lens cover tube 28) images the portion of grid 20 located under open end 38 of nose cone 30 onto camera 22. Lens 26 is preferably a 35 millimeter F2.8 bellows lens.

At the outer end of nose cone 30 are three feet or contact points 40 which are equally spaced around the outer edge of opening 38. When camera unit 14 is in use, the operator positions contact points 40 onto sheet metal specimen 12 directly above the circle (undeformed or deformed) of interest. Contact points 40 establish the object plane which is a known distance from lens 26 and from the image plane of camera 22. This ensures that a known magnification of the circle takes place. If the relative position of the circle with respect to lens 26 were permitted to vary, different magnifications would occur, which would result in inaccuracies in the strain measurements.

Light source 24 and light diffuser ring 25 (which are located within lens cover tube 28) provide diffused illumination of the portion of grid 20 located at the object plane. In one embodiment light source 24 is a ring of ten miniature incandescent lamps. The intensity of the light from light source 24 is controllable by the operator by means of potentiometer 36. Since the apparent line width of the circles is a function of illumination, potentiometer 36 permits the operator to adjust the illumination to enhance the image being processed by system 10. For example, an increase in light intensity level can help eliminate the appearance of small marks and blemishes in the image, but also results in a reduction in the apparent thickness of the line width of the circle. Conversely, a reduction in light intensity level can be used to increase the apparent thickness of the line to help fill in thin regions of that line.

Trigger switch 34 is a two-position switch. The first position turns on light source 24 to its operating level. By pulling trigger switch 34 back further to the second position, the operator causes a signal to be sent to console 16 which causes a frame of the analog image from camera 22 to be processed.

As shown in FIGS. 1 and 3, console 16 includes terminal 42, monitor 44, computer 46, power supply 47 and interface 48, all of which are contained within console housing 50.

In a preferred embodiment of the present invention, terminal 42 is a Burr Brown TM77 microterminal which includes alphanumeric display 52, numeric/function keypad input 54 and an array of indicator lights 56. Alphanumeric display 52 has a sixteen character display capability for displaying prompts as well as engineering and true strain values.

Keypad 54 includes a numeric keyboard (0-9) and function keys (F1-F8) that allow the operator to enter messages up to eighty characters long. In response to most prompts, the operator keys in a short number or function key message and pushes an enter key. The function key messages (F1-F8) are transmitted immediately on depression to computer 46.

Indicator lights 56 provide status indications for terminal 54, as well as other indications under the control of computer 46.

Video monitor 44 is a cathode ray tube (CRT) monitor which allows the operator to view the specimen 12 during camera focusing and orientation. The image displayed by monitor 44 is preferably selectable by switch 58 of interface 48 (FIG. 3) so that the image displayed in either an analog video image or a binary video image.

Digital computer 46 is, in one preferred embodiment, a Digital Equipment Corporation Micro PDP-11/23 computer with dual floppy disk drives for program and data storage. Computer 46 calculates true and engineering strain values based upon data derived by interface 48 from the analog video.

Power supply 47 provides electrical power to interface 48, computer 46, monitor 44 and terminal 42 of console 16 and to trigger switch 34, light source 24 and camera 22 of hand-held camera unit 14.

Interface 48 performs three main functions in system 10: dynamic thresholding, edge location, and direct memory access. In addition, interface 48 provides analog and binary video outputs to monitor 44.

In the embodiment shown in FIG. 3, interface 48 includes switch 58, camera input control circuit 60, dynamic thresholding circuit 62, edge location circuit 64, and direct memory access (DMA) circuit 66.

Camera input control circuit 60 provides an interface between camera 22 of hand-held camera unit 14 and console 16. Camera input control circuit 60 is also responsive to trigger switch 34 so that when trigger switch 34 is depressed to the second switch position, camera input control 60 causes interface 48 to begin processing a frame of analog video from camera 22.

In dynamic thresholding circuit 62, a threshold value is compared to the analog gray scale video image received from camera 22 to produce a binary video image. This binary video image is composed of an array of 244×248 discrete picture elements (pixels) which are either white ("0") or black ("1").

The threshold value is the percentage of the total light range of camera 22 at which the binary video output changes from black to white. By comparing the intensity of light at each pixel with this threshold value, either a black dot or "1" (light intensity below threshold) or a white dot or "0" (light intensity above threshold) is assigned to each pixel location.

In a preferred embodiment of the present invention, dynamic thresholding circuit 62 uses a dynamic or variable threshold, rather than a fixed threshold value. In this embodiment, the threshold value is permitted to vary slightly as a function of an integral of the analog signal waveform being received from camera 22. In this way, dynamic thresholding circuit 62 accommodates nonuniformities in the illumination from light source 24 which cause variations in the analog signal level which are unrelated to the presence of the patterns. By the use of a dynamic threshold value, fluctuations in the analog signal due to nonuniformity in illumination do not result in inaccuracies in the binary video image which is produced.

Edge location circuit 64 analyzes the binary video image to locate black/white ("1" to "0") and white/black ("0" to "1") transitions. Edge location circuit 64 performs this function by sequentially scanning each line of the binary video image and recording the locations at which dissimilar pixels (black and white) are adjacent to each other. The locations of these transition points are expressed in X-Y coordinate form and represent a transition point image of the pattern being viewed by camera 22.

In a preferred embodiment of the present invention, edge location circuit 64 includes X and Y counters (not shown) which maintain a count of the particular column and line location of each bit or pixel of the binary video. Edge location circuit 64 compares the state of the present bit with the state of the preceding bit. If the two bits are the same, edge location circuit 64 proceeds to the next bit in the line and increments the X counter. If, on the other hand, the present bit and the last bit are different, edge location circuit 64 records the location, as indicated by the counts maintained in the X and Y counter, in a first-in first-out (FIFO) memory (not shown). This process is continued until all of the lines of the binary video image have been processed.

DMA circuit 66 provides a high speed data path from interface 48 to computer 46. Once initiated by the central processing unit (CPU) of computer 46, DMA circuit 66 transfers the transition point image data stored in the FIFO memory directly to memory within computer 46, without CPU intervention.

Figure 4A:
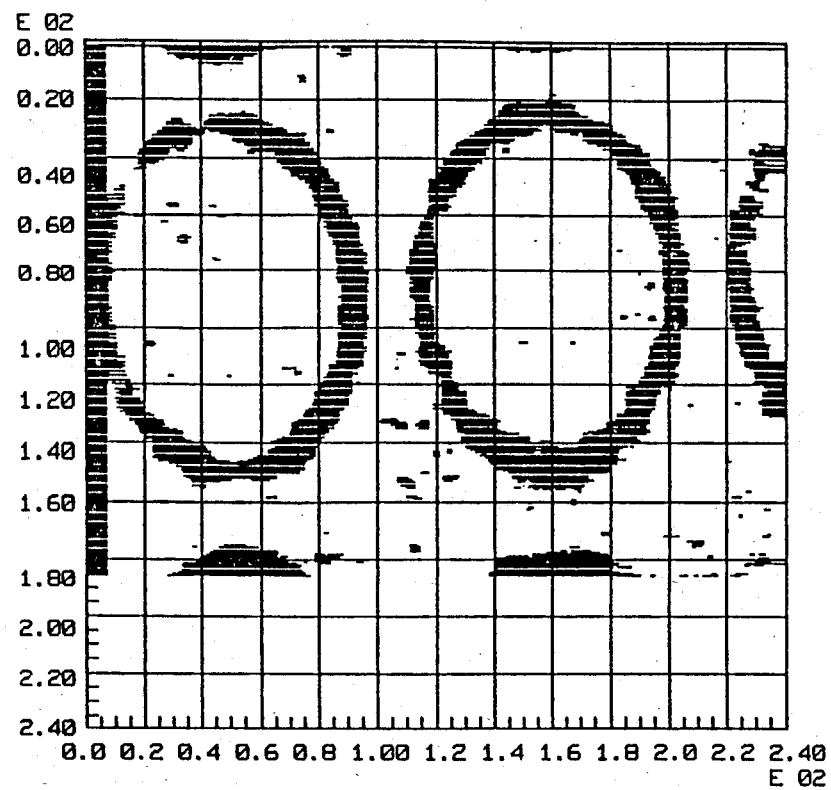
FIG. 4A shows a binary video image produced by the dynamic threshold circuit of the optical grid analyzer system.
Figure 4B:
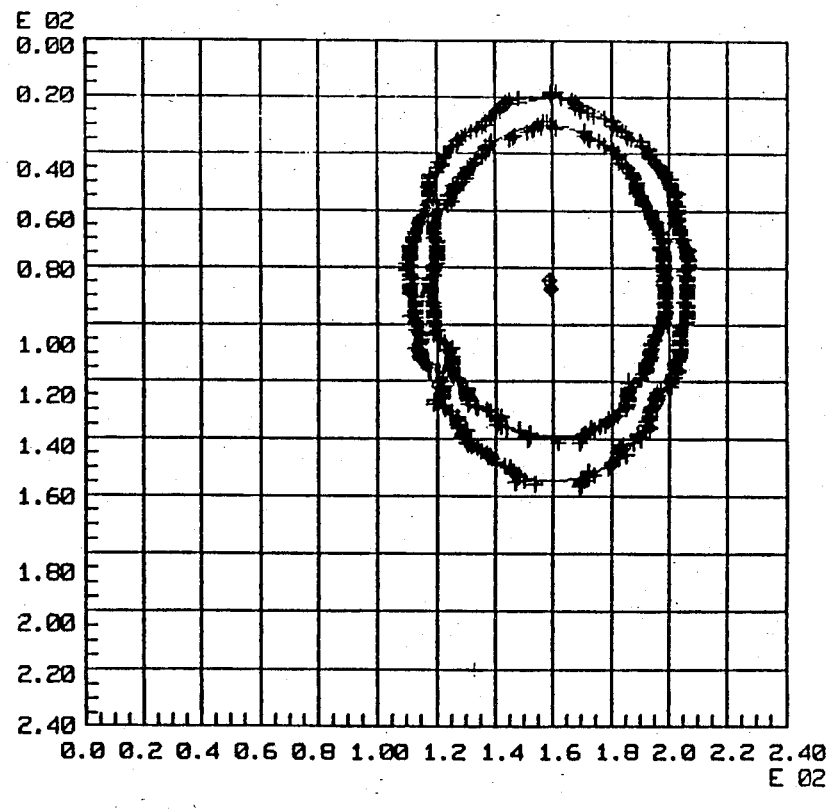
FIG. 4B shows a transition point image of inner and outer edges of the centermost deformed circle shown in FIG. 4A, as produced by the edge location circuit of the optical grid analyzer system.

FIGS. 4A and 4B are graphical representations of the data that is produced by interface 48 based upon the analog video received from camera 22. FIG. 4A is a graph showing the binary video image generated by dynamic thresholding circuit 62. FIG. 4B shows the transition point image produced by edge location circuit 64 for the centermost deformed circle shown in FIG. 4A. In both FIGS. 4A and 4B, the axes are labeled in pixel locations.

FIG. 4B shows how edge location circuit 64 produces data which represents two ellipse patterns: one representing the outer edge and the other representing the inner edge of the deformed circle. Digital computer 46 uses the transition point image which has been transferred by DMA circuit 66 to memory to derive major and minor radii of the ellipse pattern, and from those radii (and the original radius of the undeformed circle) calculates strain values.

Computer 46 first performs a circle select routine which groups together the transition point data representing the inner edge and the transition point data representing the outer edge of the centermost circle (or ellipse) in the image. Data representing portions of other circles and small dots or blobs are discarded.

This circle select routine uses a connectivity/continuity algorithm which moves outward from the center of the circle to each edge, and follows the left and right edges upward until they meet, and similarly follows the left and right edges downward until they meet. If a small gap in the edge data exists, computer 46 is preferably permitted to search within a predetermined number of pixels for a continuation of the edge, so that slight irregularities or gaps in the edge of the circle or ellipse are accommodated. All transition point data that is not united by the connectivity/continuity algorithm (e.g. other circle parts and blobs) is discarded.

The edge data is then segregated into two sets; the first set consists of transition points on the outer edge of the circle, and the second set consists of transition points on the inner edge of the circle. The segregation routine is based on the direction of the transition at each data point (black going to white, or white going to black) and the location of the data point with respect to the left and right sides of the circle. The following examples demonstrate the function of the segregation routine for a black circle on a white background (FIG. 4A) that is scanned from the left to the right:

1. A white-to-black transition that is left of the ellipse center is on the outer edge.
2. A black-to-white transition that is left of the ellipse center is on the inner edge.
3. A white-to-black transition that is right of the ellipe center is on the inner edge.
4. A black-to-white transition that is right of the ellipse center is on the outer edge.

Computer 46 then translates the origin of the Cartesian coordinates used to describe the transition point locations to the center of the pixel data. This eliminates skewing of the curve fit ellipses with respect to the center of the image that would otherwise result from the subsequent least squares curve fit routine.

The two sets of transition point image data, representing the inner edge and the outer edge of the pattern are each fit to the generic equation for an ellipse:

$$Ax^2 + Bxy + Cy^2 + Dx + Ey = 1$$

This curve fitting is performed by computer 46 using a least squares fit routine.

If the distance between the centers of the inner and outer ellipses exceeds a predetermined number of pixels, a center offset error is present, and the measurement must be repeated. Computer 46 provides an error message through display 52 of terminal 42.

If the centers of the two ellipses are within the predetermined number of pixels of one another, the major and minor radii for the inner edge and the major and minor radii of the outer edge are calculated by computer 46. The average of the inner and outer major radii is then calculated by computer 46 to produce an average major radius of the ellipse. Similarly, the inner and outer minor radii are averaged to produce an average minor radius of the ellipse. These average major and minor radii represent the center of the line which forms the ellipse, and therefore are essentially independent of variations in illumination of the specimen. In other words, variations in illumination of the specimen may result in different inner and outer major and minor radii due to the difference in apparent line thickness of the ellipse. The average of the inner and outer major radii will, however, remain essentially the same despite variations in illumination.

Finally, digital computer 46 calculates engineering and true strains from the radius of the undeformed circle and the average major and minor radii.

In one preferred embodiment of the present invention, it has been found that system 10 determines principal strains from a deformed circle in approximately three seconds. The repeatability of these measurements is about 0.2% strain when the optics are set for a maximum strain of 100%. Final accuracy is, of course, dependent not only on the operation of system 10, but also on the accuracy of the initial pattern of circles applied to specimen 12.

In conclusion, the optical grid analyzer of the present invention provides significant advantages over both manual measurements sytsems used for circle grid analysis, as well as prior art computerized GCA system. The system of the present invention is easy and convenient to use by an operator, utilizes a hand-held camera unit which provides its own illumination, requires less time to complete a strain analysis, and requires much less computer storage, computation time and computing power.

Although the present invention has been described with reference to preferred embodiments, workers skilled in the art will recognize that changes may be made in form and detail without departing from the spirit and scope of the invention.

What is claimed is:

1. A system for automatically determining strain in sheet metal by a forming operation, the sheet metal having a grid of open circles thereon, the open circles having a predetermined circle size parameter prior to the forming operation and wherein the open circles are stretched into patterns of generally elliptical shape as a result of the forming operation, the system comprising:

means for producing signals representative of light intensity of pixels of an image of a portion of the sheet metal in which including one of the patterns;

means for converting each of the signals to a binary value representative of whether the light intensity exceeds a threshold to produce a binary image;

means for producing transition point data representing coordinates of pixels of the binary image which are located on an image edge;

means for deriving an outer edge of the pattern from the transition point data;

means for deriving an inner edge of the pattern from the transition point data;

means for deriving first ellipse parameters of the outer edge;

means for deriving second ellipse parameters of the inner edge;

means for deriving average ellipse parameters of the pattern based upon the first and second ellipse parameter; and means for calculating strain values based upon the ellipse parameters and the predetermined circle size parameter of the undeformed circle.

2. The system of claim 1 wherein the binary image comprises a plurality of lines of binary value pixels and wherein the means for producing transition point data comprises:
   means for comparing each binary value of a line with a preceding binary value; and
   means for storing transition point data representing coordinates of a pixel on an image edge if the binary value and the preceding binary value are different.

3. The system of claim 1 wherein the means for deriving first ellipse parameters of the outer edge comprises:
   means for fitting the outer edge to a first ellipse; and
   means for deriving the first ellipse parameters from the first ellipse.

4. The system of claim 3 wherein the means for deriving second ellipse parameters comprise:
   means for fitting the inner edge of the pattern to a second ellipse; and
   means for deriving the second ellipse parameters from the second ellipse.

5. The system of claim 4 and further comprising:
   means for deriving coordinates of first and second centers of the first and second ellipses, respectively;
   means for comparing the coordinates of the first and second centers and providing an error signal if the first and second centers are greater than a predetermined distance apart.

6. The system of claim 1 wherein the first ellipse parameters are first major and minor radii of the outer edge; wherein the second ellipse parameters are second major and minor radii of the inner edge; and wherein the average ellipse parameters comprise an average major radii based upon the first and second major radii and an average minor radii based upon the first and second minor radii.

7. The system of claim 6 wherein the predetermined circle size parameter is a radius of the circle.

8. The system of claim 1 wherein the means for producing signals representative of light intensity comprises a hand-held camera unit which includes:
   video camera means for producing video signals representative of light intensity of pixels of an image at an image plane;
   lens means supported in a predetermined spatial relationship to the video camera means for imaging a portion of the specimen located at an object plane onto the image plane of the camera means;
   light source means supported in a predetermined spatial relationship to the video camera means for illuminating the specimen at the object plane; and
   means for engaging the sheet metal to define a fixed spatial relationship between the sheet metal and the lens means.

9. The system of claim 8 wherein the hand-held camera unit further includes:
   a handle grip for supporting the video camera means when held in an operator's hand.

10. The system of claim 9 wherein the hand-held camera unit further includes:
    a trigger switch on the handle grip having a first trigger position which actuates the light source means and having a second trigger position which causes a signal to be provided to the means for converting each of the signals to a binary value to initiate operation of the means for converting.

11. The system of claim 8 wherein the hand-held camera unit further includes:
    light intensity control means for controlling intensity of light produced by the light source means.

12. The system of claim 8 wherein the means for engaging the sheet metal comprises a hollow nose cone which extends forward of the lens means, which has an opening at an outer end and which has a plurality of spaced contact points arranged around the opening to engage the sheet metal and define a fixed spatial relationship between the sheet metal and the lens means.

13. A system for automatically determining strain in a sheet metal resulting from a forming operation, the sheet metal having a grid of open circles thereon, each of the circles having a predetermined circle size parameter prior to the forming operation, which opens circles are stretched into patterns of generally elliptical shape as a result of the forming operation, the system comprising:
    video camera means for producing a gray scale video image of a portion of the sheet metal which includes one of the patterns;
    threshold means for converting the gray scale video image to a binary image by comparing each pixel of the gray scale video image to a threshold;
    edge location means for converting the binary image to a transition point image which represents coordinates of pixels of the binary image which are located on an image edge; and
    digital computer means for separating the transition point image into data representative of an outer edge of the pattern and data representative of an inner edge of the pattern; for fitting the outer edge to a first ellipse and the inner edge to a second ellipse; for deriving first and second ellipse parameters from the first and second ellipses; for deriving average ellipse parameters of the pattern from the first and second ellipse parameters; and for calculating strain values based upon the average ellipse parameters and the predetermined circle size parameter.

14. The system of claim 13 wherein the first ellipse parameters are first major and minor radii of the outer edge; wherein the second ellipse parameters are second major and minor radii of the inner edge; and wherein the average ellipse parameters comprise an average major radii based upon the first and second major radii and an average minor radii based upon the first and second minor radii.

15. The system of claim 14 wherein the predetermined circle size parameter is a radius of the circle.

16. The system of claim 13 wherein the edge location means compares each pixel with a preceding pixel and stores transition point data representing coordinates of an image edge if the pixel and the preceding pixel are different.

17. The system of claim 13 wherein the digital computer derives coordinates of first and second centers of the first and second ellipses, respectively and compares the coordinates of the first and second centers to produce an error signal if the first and second centers are greater than a predetermined distance apart.

18. The system of claim 13 wherein the video camera means comprises:

a video camera for producing video signals representative of light intensity of pixels of an image on an image plane;

lens means for imaging a portion of the specimen located at an object plane onto the image plane of the camera;

light source means for illuminating the specimen at the object plane;

means for supporting the lens means and the light source means in fixed relationship to the camera means; and means for engaging the sheet metal to define a fixed spatial relationship between the sheet metal and the lens means.

19. The system of claim 18 wherein the video camera means further comprises:

a handle grip for supporting the video camera when held in an operator's hand.

20. The system of claim 19 wherein the video camera means further includes:

a trigger switch on the handle grip having a first trigger position which actuates the light source means and having a second trigger position which causes the threshold means to initiate operation.

21. The system of claim 20 wherein the video camera means further includes:

light intensity control means for the intensity of light produced by the light source means.

22. A method of automatically determining strain in sheet metal resulting from a forming operation, the sheet metal having a grid of open circles thereon, each of the circles having a predetermined circle size parameter prior to the forming operation, which open circles are stretched in patterns of generally elliptical shape as a result of the forming operation, the method comprising:

producing a gray scale video image of a portion of the sheet metal which includes one of the patterns;

converting the gray scale video image to a binary image;

converting the binary image to a transition point image which represents coordinates of pixels of the binary image which are located on an image edge;

separating the transition point image into data representative of an outer edge of the pattern and data representative of an inner edge of the pattern;

fitting the outer edge to a first ellipse;

fitting the inner edge to a second ellipse;

deriving first ellipse parameters from the first ellipse;

deriving second ellipse parameters from the second ellipse;

deriving average ellipse parameters of the pattern from the first and second ellipse parameters;

calculating strain values based upon the average ellipse parameters and the predetermined circle size parameter.

* * * * *